W. A. TURBAYNE.
ELECTRICAL SYSTEM OF DISTRIBUTION.
APPLICATION FILED FEB. 25, 1907.
899,145.  Patented Sept. 22, 1908.
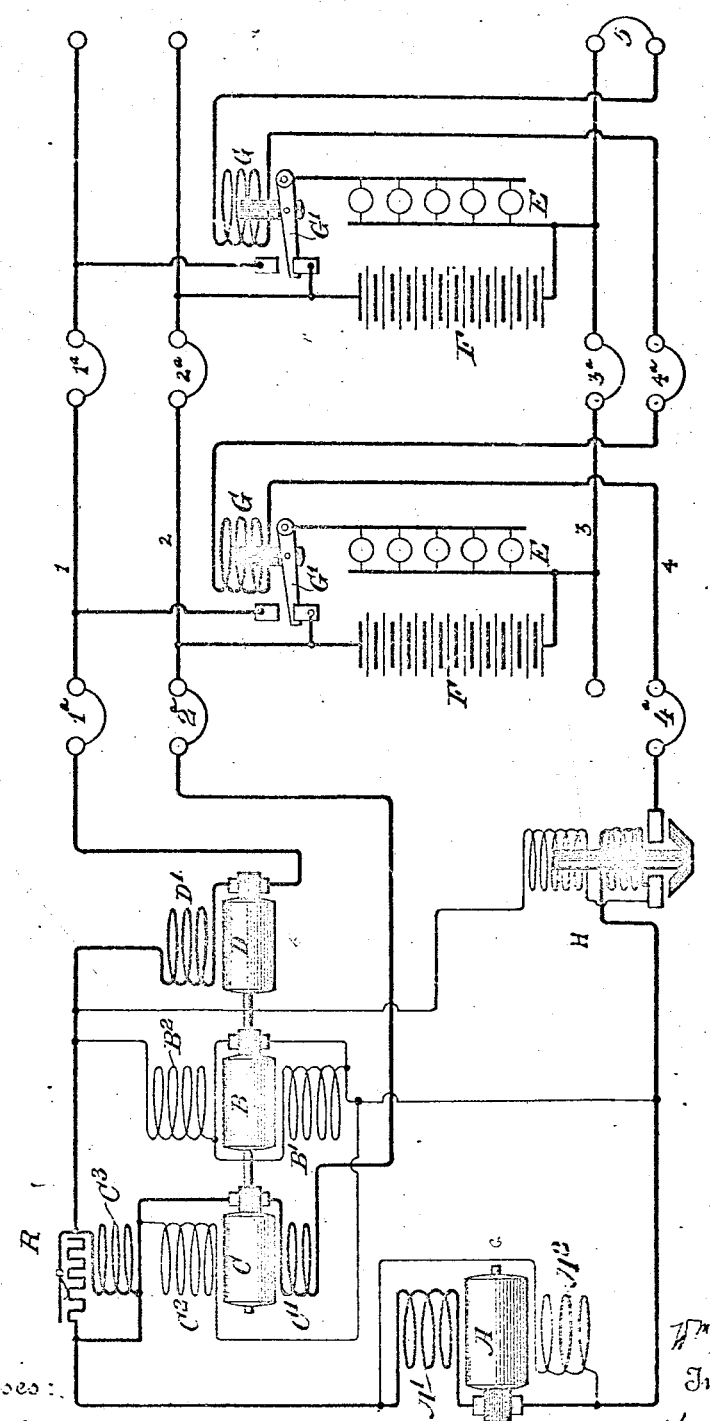

UNITED STATES PATENT OFFICE.

WILLIAM A. TURBAYNE, OF LANCASTER, NEW YORK, ASSIGNOR TO GOULD STORAGE BATTERY COMPANY, A CORPORATION OF NEW YORK.

ELECTRICAL SYSTEM OF DISTRIBUTION.

No. 899,145.      Specification of Letters Patent.      Patented Sept. 22, 1908.

Application filed February 25, 1907. Serial No. 359,240.

*To all whom it may concern:*

Be it known that I, WILLIAM A. TURBAYNE, a citizen of the United States, and a resident of Lancaster, in the county of Erie, State of New York, have invented certain new and useful Improvements in Electrical Systems of Distribution, of which the following is a specification.

My invention relates to electrical systems of distribution and is especially applicable to train lighting systems of the type of that set forth in patent to Chamberlain No. 771,710, dated October 4, 1904.

In systems of this character a main dynamo is provided on one of the train units capable of supplying substantially all the lights on the train, while upon each car there is a storage battery and a lamp circuit containing the lights of the car, the storage battery being used to supply the current to the lights when the car is detached, or at any other time when it is not desired to supply the power from the generator. In the Chamberlain system there is a conductor leading from the generator and extending throughout the train, this conductor being connected to the various lamp circuits to supply current to the same when the generator is in operation, this conductor being hereinafter called the work circuit conductor. There is also a second conductor extending from the generator throughout the train and connecting the generator and storage batteries when the generator is in operation to supply a charging current to the batteries, this conductor being hereinafter called the charging circuit conductor. There is also a conductor to which all of the batteries and lamp circuits are connected which is preferably arranged in the form of a loop, the batteries and lamp circuits being connected to one side of the loop, while the generator is connected to one end of the other side of the loop. The purpose of making this common return conductor in the form of a loop is to equalize the voltage as much as possible at different points in the train. In this system it is desired that the lamp circuit have as nearly a constant voltage as possible across the lamps, while the batteries are simultaneously charging, a higher voltage being applied to the batteries. To this end there has been provided in the charging circuit conductor a booster which gives the higher voltage necessary and which is automatically regulated to reduce the charging current as the number of lamps are increased thereby maintaining a relatively steady load upon the main generator. This general character of system is efficient and advantageous. However, in practice the load on the lamp circuit varies considerably because of the differences between different lengths of train, and also on account of the varying needs at different times of the day. This variation, due to variations of load, is especially great in these train lighting systems owing to the difficulties of wiring a train in the most efficient manner. The object of my invention is to provide means whereby this variation of voltage, due to variations of load in such a train lighting system, or an analogous system, will be reduced to a negligible factor, so that a substantially constant voltage may be applied to the lamps and the desired charging voltage be applied to the batteries regardless of the variations of load in the work circuit.

Special means are necessary in this class of system because the variations which give rise to the trouble are not variations of the total generator load and therefore the result cannot be obtained by a mere compounding of the generator, for the booster in the charging circuit is arranged so that its voltage shall fall and therefore the current in the charging circuit will be decreased whenever the current in the work circuit increases. In order to overcome this difficulty I have provided a supplemental generator, preferably a dynamo booster, in the working circuit conductor and have regulated it by controlling its voltage in accordance with the current in the working circuit conductor so that as the number of lamps increases the voltage of the booster will increase correspondingly. The same change of current in the lamp circuit acts oppositely upon a booster in the charging circuit to reduce its voltage as the current in the work circuit increases and thereby permits less current to pass through the charging circuit conductor to the batteries. At the same time in order that the charging circuit shall be at the desired voltage regardless of the length of the train, I have provided a regulating coil for the charging circuit booster which is located in the charging circuit and arranged to increase the voltage of the charging circuit booster as the current in the charging circuit increases, as will occur if any car is added to the train requiring an additional storage battery group to be charged. Preferably I combine with the above means a compounding of the main generator sufficient to compensate for any changes of drop in that portion of the common return conductor in which the total generator current is passing. This slight rising characteristic of the main generator makes it unnecessary to give the series coils of the two boosters as great a value as it would otherwise be necessary to give them. It will be seen, therefore, that the working circuit booster compensates for changes of the drop in the working circuit conductor and in a part of the loop conductor caused by current changes in the working circuit; that the charging circuit booster compensates for the drop in the charging circuit conductor and in a part of the loop conductor caused by changes of the charging current; that the compounding of the main generator serves to compensate for changes of current of both circuits causing changes of drop in that portion of the loop conductor in which all the generator current is passing; and that the charging circuit booster also varies in order to maintain the desired relatively constant load upon the main generator.

While I have above outlined the general arrangement, the various features that I prefer, yet it is not essential to my broad invention that all the features above set out should be combined in a single system, as novel and efficient results may be obtained without employing the exact arrangement described. Moreover, while I have devised this invention for use with train lighting systems, it is clear that the invention is not limited to this specific class of system.

The drawing accompanying this specification is a diagram illustrating a specific embodiment of my invention.

In the drawing A, B, C, D, H, R and related parts are supposed to be carried upon one of the train units as, for example, the baggage car, or A, which is the main generator, may be carried on the locomotive and the other apparatus referred to may be carried on another unit. The drawing indicates two other units, but it is to be understood that there may be any number of units.

A is the main generator of the system and may be rotated in any suitable manner as, for example, by a steam turbine on the locomotive.

E, E represent lamp circuits on different cars of the train and F, F represent groups of storage batteries on the several cars.

From one terminal of the generator A there extends throughout the train a conductor made continuous by connectors $1^a$ between the different cars. From the same terminal of the generator there extends a conductor 2 made continuous by similar connectors $2^a$. From the other terminal of the generator A there extends throughout the train a conductor 4 made continuous by the connectors $4^a$, and this conductor at its outer end is connected by a loop 5 to a conductor 3 made continuous by a connector $3^a$. One terminal of each of the batteries F and lamp circuits E is connected to the conductor 3, the other terminal of each battery is, in the present instance, permanently connected to the conductor 2, this conductor being that through which the charging current is to pass when the complete apparatus is in operation, which conductor I will hereinafter refer to as the charging current conductor. The other terminal of each lamp circuit E is connected to the movable blade G' of an electro-magnetic switch G, the contacts of which, as indicated, are connected one to a battery terminal and the other to the conductor 1. The coils of these magnetic switches, as shown, are in the conductor 4 so that the switch blade G' will be raised to make contact with the upper contact whenever sufficient current is flowing through the conductor 4. This cannot occur until the electro-magnetic switch H at the generating end of the system is closed.

When the switch blades G' are down the switch H is also opened and each lamp circuit is supplied only by the current of the battery on the same car. As the particular arrangement, and functions and operation of switches G and H are not new with the present application, I will not describe them further, but will describe the remaining apparatus and the mode of operation of the same on the assumption that the switches G' are raised and the switch H is closed, this being the condition of these switches when the generating plant is in operation. When the switches G', then, are up and the switch H is closed the current to the lamp circuits is supplied from the generator A through the conductor 1 returning from the lamp circuit by way of conductors 3 and 4. The loop formed by conductors 3 and 4 is provided in order to maintain a substantially uniform voltage on different parts of the system. The current to charge the batteries is provided from the generator through the conductor 2 and returns to the generator through the conductors 3 and 4. It is desired that while this operation is being carried on the load on the generator A shall remain approximately steady, that whatever current is required by the lamp circuits shall be supplied by the generator and that the voltage across the lamp circuit shall be substantially uniform at that value for which the lamps are suited, and that a sufficient charging voltage be supplied to charge the batteries with a current varying inversely as the current required by the lamps varies. Moreover, it is desired that none of these conditions vary to a marked extent when the number of cars of the train is changed or any other condition arises that calls for a substantially different lamp load. I meet these conditions by the provision of means which I will now describe. The generator A is a compound wound generator provided with coils A' and A², the former being the series or compound coil. This coil A' is wound only to compensate for the varying drop in the conductor 4. It is impossible to provide the necessary regulation for varying load for the entire drop in the system by compounding the generator A because, regardless of the lamp load, it is desired to maintain the generator load substantially steady, whereas the compounding of the main generator can only provide for variations of the total current and cannot compensate for relative changes of load between the charging and the lamp circuits. It is not absolutely essential that the generator A be compounded to compensate for the drop in the conductor 4 as such a change may also be provided for by the design of the other apparatus to which I will refer.

In the circuit of the conductor 1 is a booster D having a controlling coil D' connected in series in the same conductor. In the present instance this coil is indicated as the field winding of the booster. This coil is wound to compensate for the varying lamp circuit loads so that the booster D has a rising characteristic to regulate the lamp voltage according to the number of lamps in circuit and thereby maintain a substantially constant voltage at the lamps. In view of the design of the coil A' above described, the coil D' is wound to cause a change of electro-motive-force of the booster D substantially equal to the drop in the conductors 1 and 3 caused by the variations of lamp circuit load. The booster is driven by a motor B which is indicated as a compound wound motor having a series coil B² and a shunt coil B'.

C is another booster connected in the conductor 2 and also mechanically connected to the motor B to be driven thereby. This booster has a shunt coil C² and a series coil C' which constitutes a regulating coil for the booster, and which is connected in series with it in the conductor 2. This coil C' is wound so as to compensate for changes of drop caused in the conductors 2 and 3 by variations of current in the charging circuit. The booster C is also provided with another regulating coil C³ which is shown as connected in the conductor 1 and which is a differential coil, that is, the magnetism it produces opposes that produced by the coils C' and C². I have shown this coil as connected across an adjustable shunt R, but it is, nevertheless, in the circuit of the conductor 1 because its current is directly in accordance with that of the conductor 1. Whenever there is a variation of load in the conductor 1, the voltage or electro-motive-force produced by booster C is oppositely varied because of the differential effect of the coil C³, thus oppositely varying the charging current and tending to minimize variations of current on the main generator. At the same time the coil C' being directly responsive to changes of the charging current will further regulate booster C to produce just the desired voltage to compensate for drop in the conductors 2 and 3. It will be seen, therefore, that the work circuit and the charging circuit each have their booster and that whenever there is a change of work circuit load the work circuit booster is immediately varied to vary the voltage of the lamp circuit without affecting the generator voltage, while the charging circuit booster is immediately varied in the opposite direction to produce the desired inverse change of the charging current. In addition to this, added compensation is effected by the coils C' and A' as above described.

Having thus described my invention what I claim as new and desire to secure by Letters Patent is:—

1. In an electric system of distribution, a main generator, two circuits fed thereby, a supplementary generator in series in each circuit, and means for acting upon both supplementary generators responsively to changes of electrical condition of one of the circuits to oppositely affect the voltage of the two circuits.

2. In an electric system of distribution, a main generator, two circuits fed thereby, a supplementary generator in series in each circuit, and means for acting upon both supplementary generators responsively to changes in current strength of one of the circuits to oppositely affect the voltage of the two circuits.

3. In an electric system of distribution, a main generator, two circuits fed thereby, a supplementary generator in series in each circuit, and means for oppositely varying the electro-motive forces of said supplementary generators responsively to changes of electrical condition of one of the circuits.

4. In an electric system of distribution, a main generator, two circuits fed thereby, a supplementary generator in series in each circuit, and means for oppositely varying the electro-motive forces of said supplementary generators responsively to changes in current strength.

5. In an electric system of distribution, a main generator, two circuits fed thereby, a supplementary generator in series in each circuit, a controlling coil for one supplementary generator arranged to reduce the electro-motive force thereof, a controlling coil for the other supplementary generator arranged to increase the electro-motive force thereof, said coils being connected to vary responsively to current changes of one of the two circuits.

6. In an electric system of distribution, a generator, two circuits fed thereby, a booster in one circuit automatically regulated to produce an electro-motive-force increasing with increases of current of one of said circuits, and a booster in the other circuit automatically regulated to produce an electro-motive-force decreasing with increase of current of the same circuit.

7. The combination of a main generator, a storage battery, a work circuit, a supplementary generator in the storage battery circuit, a supplementary generator in the work circuit, and means for automatically regulating said supplementary generators responsively to variations of the electrical condition of said work circuit.

8. The combination of a main generator, a storage battery, a work circuit, a supplementary generator in the storage battery circuit, a supplementary generator in the work circuit, and means for automatically regulating said supplementary generators responsively to variations of the current strength of said work circuit.

9. The combination of a main generator, a storage battery, a work circuit, a supplementary generator in the storage battery circuit, a supplementary generator in the work circuit, and means for automatically and oppositely regulating said supplementary generators responsively to variations of the electrical condition of said work circuit.

10. The combination of a main generator, a storage battery, a work circuit, a supplementary generator in the storage battery circuit, a supplementary generator in the work circuit, and a regulating coil for each supplementary generator, the two coils being in series in the work circuit.

11. In a train lighting system, a main generator, a charging circuit fed thereby, a storage battery located therein, a circuit connecting the main generator and the lamps, and automatically regulated supplementary generators located respectively in the charging circuit and in the lamp circuit.

12. In a train lighting system, a main generator, a charging circuit fed thereby, a storage battery located therein, a circuit connecting the main generator and the lamps, supplementary generators located respectively in the charging circuit and in the lamp circuit, and means for automatically and oppositely regulating said supplementary generators responsively to variations of load on the lamp circuit.

13. In a train lighting system, a train generator, a charging circuit fed thereby, a storage battery located therein, a circuit connecting the main generator and the lamps, supplementary generators located respectively in the charging circuit and in the lamp circuit means for reducing the electro-motive-force of the charging circuit supplementary generator as the lamp current increases, and means for increasing the electro-motive-force of the lamp circuit supplementary generator as the lamp current increases.

14. In a train lighting system, a main generator, a plurality of storage batteries, a plurality of lamp circuits, a charging circuit connected to the several batteries, a work circuit including the various lamp circuits, a booster in the lamp circuit controlling the voltage thereof, and a booster in the charging circuit controlling the voltage of that circuit.

15. In a train lighting system, a main generator, a plurality of storage batteries, a plurality of lamp circuits, a charging circuit connected to the several batteries, a work circuit including the various lamp circuits, a booster in the lamp circuit controlling the voltage thereof, a booster in the charging circuit controlling the voltage of that circuit and a motor mechanically connected to both boosters.

16. A main generator, a charging circuit and storage batteries therein, a work circuit, a booster in the charging circuit, a controlling coil therefor in the charging circuit and a second controlling coil therefor in the work circuit, said coils opposing each other, a booster in the work circuit and a controlling coil therefor in the same circuit.

17. A main generator, a charging circuit and storage batteries therein, a work circuit, a booster in the charging circuit, means for increasing the electro-motive-force of said booster responsively to current increases in the charging circuit and for decreasing said electro-motive-force responsively to current increases in the work circuit, a booster in the work circuit, and means for increasing the electro-motive-force thereof responsively to current increases in the work circuit.

18. In a train lighting system, two circuits fed from a common source, a booster in each circuit, means for causing current increases in each circuit to regulate the booster in that circuit to increase the electro-motive-force thereof, and means for causing current increases in one of the circuits to regulate the booster in the other circuit to decrease the electro-motive-force thereof.

19. In an electric system of distribution, a main generator excited to have a rising characteristic, a plurality of batteries and lamp circuits, a charging circuit conductor connected to the several batteries, a work circuit conductor connected to the various lamp circuits, a conductor common to the batteries, a booster in the work circuit conductor, another in the charging circuit conductor, and regulating coils for each of said boosters so connected as to tend to give each of them rising characteristics.

20. In an electric system of distribution, a main generator excited to have a rising characteristic, a plurality of batteries and lamp circuits, a charging circuit conductor connected to the several batteries, a work circuit conductor connected to the various lamp circuits, a conductor common to the batteries, a booster in the work circuit conductor, another in the charging circuit conductor, a regulating coil for the former booster connected to give it a rising characteristic, a regulating coil for the latter booster tending to give it a rising characteristic, and a second regulating coil for the latter booster connected to lower its electro-motive-force as the current in the work circuit increases.

21. In an electric system of distribution, a main generator, a battery circuit and a work circuit connected thereto, a conductor common to both circuits and connected to the generator, a field coil on the generator connected and wound to vary its voltage in accordance with variations of drop in said common conductor, and boosters in the charging and work circuits each having series coils connected and wound to vary their electro-motive-forces to compensate for variations of drop in the separate portions of the two circuits.

22. In an electric system of distribution, a main generator, a battery circuit and a work circuit connected thereto, a conductor common to both circuits and connected to the generator, a field coil on the generator connected and wound to vary its voltage in accordance with variations of drop in said common conductor, boosters in the charging and work circuits each having series coils connected and wound to vary their electro-motive-forces to compensate for variations of drop in the separate portions of the two circuits, and a field coil on the charging circuit booster connected and arranged to vary its electro-motive-force inversely as the current in the work circuit changes.

23. In a train lighting system, a main generator, a plurality of storage batteries, a plurality of lamp circuits, a work circuit conductor connecting the generator with the several lamp circuits, and a booster therein, a charging circuit conductor connecting the generator with the several batteries and a booster therein, a third conductor connected to the several batteries and lamp circuits, a return conductor connecting the outer end of the third conductor with the generator, means for regulating the main generator to compensate for varying drops in said return conductor, means for regulating the charging circuit booster to compensate for varying drops of potential in said charging circuit conductor and in said third conductor due to variations of charging conductor, and means for regulating the work circuit booster to compensate for varying drops in the work circuit conductor and in the said third conductor due to variations of lamp current.

24. In a train lighting system, a main generator, a plurality of storage batteries, a plurality of lamp circuits, a work circuit conductor connecting the generator with the several lamp circuits, and a booster therein, a charging circuit conductor connecting the generator with the several batteries and a booster therein, a third conductor connected to the several batteries and lamp circuits, a return conductor connecting the outer end of the third conductor with the generator, means for regulating the main generator to compensate for varying drops in said return conductor, means for regulating the charging circuit booster to compensate for varying drops of potential in said charging circuit conductor and in said third conductor due to variations of charging conductor, means for regulating the work circuit booster to compensate for varying drops in the work circuit conductor and in the said third conductor due to variations of lamp current, and means for inversely varying the electro-motive-force of the charging circuit booster responsively to variations of lamp current.

25. In a train lighting system, a main generator, a storage battery, a work circuit, a booster in the battery circuit, having a shunt winding, a cumulative winding in the battery circuit and an opposing winding in the work circuit, and a series wound booster in the work circuit.

26. In a train lighting system, a main generator, a storage battery, a work circuit, a booster in the battery circuit, having a shunt winding, a cumulative winding in the battery circuit and an opposing winding in the work circuit, a series wound booster in the work circuit, and a motor mechanically connected to both boosters.

27. In a train lighting system, a compound wound generator, a storage battery, a work circuit, a booster in the battery circuit, having a shunt winding, a cumulative winding in the battery circuit and an opposing winding in the work circuit, and a series wound booster in the work circuit.

28. The combination of a main generator, a work circuit supplied thereby, a storage battery and a charging circuit connecting the same to the generator, a supplementary generator in the work circuit, another in the charging circuit, and regulating coils for said supplementary generators in series therewith in their respective circuits.

29. The combination of a main generator, a work circuit supplied thereby, a storage battery and a charging circuit connecting the same to the generator, a dynamo in the work circuit having a field winding in said circuit, and a dynamo in the charging circuit having a field winding in said circuit.

In testimony whereof, I have signed my name to this specification, in the presence of two subscribing witnesses.

WILLIAM A. TURBAYNE.

Witnesses:
MARCELLUS R. SHEDD,
EDMUND M. MAW.

---

Correction in Letters Patent No. 899,145.

It is hereby certified that in Letters Patent No. 899,145, granted September 22, 1908, upon the application of William A. Turbayne, of Lancaster, New York, for an improvement in "Electrical Systems of Distribution," an error appears in the printed specification requiring correction, as follows: In line 62, page 4, the word "train," second occurrence, should read *main*; and that the said Letters Patent should be read with this correction therein that the same may conform to the record of the case in the Patent Office.

Signed and sealed this 17th day of November, A. D., 1908.

[SEAL.]

C. C. BILLINGS,
*Acting Commissioner of Patents.*